United States Patent
Manav et al.

(10) Patent No.: US 8,923,145 B2
(45) Date of Patent: Dec. 30, 2014

(54) METHOD AND SYSTEM FOR VALIDATING SERVICE INFORMATION (SI) AND PROGRAM SPECIFIC INFORMATION (PSI) IN BROADCAST TECHNOLOGIES

(75) Inventors: Yogesh Manav, Bangalore (IN); Mahantesh Sangappa Shettar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 320 days.

(21) Appl. No.: 13/131,216

(22) PCT Filed: Nov. 24, 2009

(86) PCT No.: PCT/KR2009/006918
§ 371 (c)(1), (2), (4) Date: May 25, 2011

(87) PCT Pub. No.: WO2010/062091
PCT Pub. Date: Jun. 3, 2010

(65) Prior Publication Data
US 2011/0235538 A1 Sep. 29, 2011

(30) Foreign Application Priority Data
Nov. 25, 2008 (IN) .......................... 2940/CHE/2008

(51) Int. Cl.
*G08C 15/00* (2006.01)
*H04N 5/44* (2011.01)
(Continued)

(52) U.S. Cl.
CPC .......... *H04N 5/4401* (2013.01); *H04N 21/235* (2013.01); *H04N 21/4345* (2013.01); *H04N 21/435* (2013.01); *H04N 21/4353* (2013.01)
USPC ............ 370/252; 370/290; 725/62; 725/110; 709/225

(58) Field of Classification Search
USPC .................................. 370/252, 390
See application file for complete search history.

(56) References Cited

U.S. PATENT DOCUMENTS 5,977,881 A * 11/1999 Kido ............................ 340/7.27
7,672,574 B2    3/2010 Hashimoto et al.
(Continued)

FOREIGN PATENT DOCUMENTS

EP    1612975    1/2006
JP    03993879    8/2007
(Continued)

OTHER PUBLICATIONS

PCT/ISA/237 Written Opinion issued on PCT/KR2009/006918 (5 pp.).
(Continued)

*Primary Examiner* — Donald Mills
*Assistant Examiner* — Henry Baron
(74) *Attorney, Agent, or Firm* — The Farrell Law Firm, P.C.

(57) ABSTRACT

A method and system for validating SIPSI of a broadcast table in an electronic device is provided. The method includes receiving a first cache signature and retrieving a second cache signature from a memory. The method also includes identifying differences between the first cache signature and the second cache signature. Further, the method includes performing one of updating the broadcast table and updating a portion of the broadcast table. The system includes an electronic device for validating SIPSI of a broadcast table. The electronic device includes a broadcast receiver for receiving a first cache signature and a memory for storing a second cache signature. The electronic device also includes a processor for identifying differences between the first cache signature and the second cache signature. Further, the electronic device includes the processor for performing one of updating the broadcast table and updating a portion of the broadcast table.

15 Claims, 2 Drawing Sheets

(51) Int. Cl.
*H04N 21/235* (2011.01)
*H04N 21/434* (2011.01)
*H04N 21/435* (2011.01)

(56) References Cited

U.S. PATENT DOCUMENTS

| | | | |
|---|---|---|---|
| 7,676,845 B2 * | 3/2010 | Thomas et al. | 726/26 |
| 2003/0215216 A1 * | 11/2003 | Hashimoto et al. | 386/68 |
| 2005/0144644 A1 | 6/2005 | Hirota | |
| 2012/0311272 A1 * | 12/2012 | Blumrich et al. | 711/146 |

FOREIGN PATENT DOCUMENTS

| | | |
|---|---|---|
| KR | 1020050065407 | 6/2005 |
| KR | 100683346 | 2/2007 |

OTHER PUBLICATIONS

PCT/ISA/210 Search Report issued on PCT/KR2009/006918 (3 pp.).

* cited by examiner

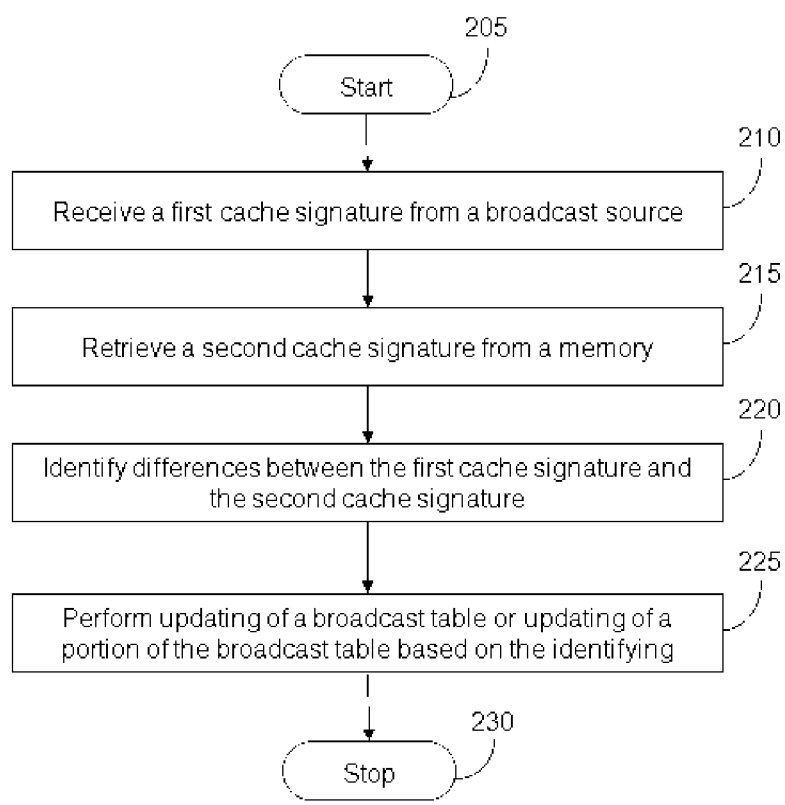

METHOD AND SYSTEM FOR VALIDATING SERVICE INFORMATION (SI) AND PROGRAM SPECIFIC INFORMATION (PSI) IN BROADCAST TECHNOLOGIES

PRIORITY

This application claims priority under 35 U.S.C. §365(c) to International Application No. PCT/KR2009/006918 filed in the Korean Intellectual Property Office (RO/KR) on Nov. 24, 2009, and priority under 35 U.S.C. §119(a) to Patent Application No. 2940/CHE/2008 filed in the Indian Patent Office on Nov. 25, 2008, the entire disclosures of which are incorporated herein by reference.

BACKGROUND OF THE INVENTION

1. Field of the Invention

The present disclosure relates to the field of broadcast technologies. More particularly, the present disclosure relates to validating service information (SI) and program specific information (PSI) of a broadcast table in an electronic device.

2. Description of the Related Art

Typically, SI and PSI (SIPSI) data of a broadcast table is validated for every launch of a visual application in an electronic device. For each of the launches, a comparison between the cached SIPSI data and a newly received SIPSI data is performed using version identification of each SIPSI table. In the current scenario, the electronic device has to receive each SIPSI table again to perform the comparison and subsequent update. However, the rate of change of the SIPSI data is low and the comparison leads to wastage of time and battery power. Further, the electronic device finds it difficult to recover when it has returned from an out of coverage area.

In light of the foregoing discussion there is a need for an efficient technique for validating service information (SI) and program specific information (PSI) of a broadcast table in an electronic device.

SUMMARY OF THE INVENTION

Embodiments of the present disclosure provide a method and system for validating service information (SI) and program specific information (PSI) of a broadcast table in an electronic device.

An example of a method for validating service information (SI) and program specific information (PSI) of a broadcast table in an electronic device includes receiving a first cache signature from a broadcast source. The method also includes retrieving a second cache signature from a memory. Further, the method includes identifying differences between the first cache signature and the second cache signature. Moreover, the method includes performing at least one of updating the broadcast table based on the identifying and updating a portion of the broadcast table based on the identifying.

An example of an electronic device for validating service information (SI) and program specific information (PSI) of a broadcast table includes a broadcast receiver for receiving a first cache signature. The electronic device further includes a memory for storing a second cache signature. The electronic device also includes a processor for identifying differences between the first cache signature and the second cache signature. Further, the electronic device includes the processor for performing at least one of updating the broadcast table based on the identifying and updating a portion of the broadcast table based on the identifying.

As mentioned above, the present invention provides an efficient technique for validating service information (SI) and program specific information (PSI) of a broadcast table in an electronic device.

BRIEF DESCRIPTION OF THE DRAWINGS

The accompanying figures, similar reference numerals may refer to identical or functionally similar elements. These reference numerals are used in the detailed description to illustrate various embodiments and to explain various aspects and advantages of the present disclosure.

FIG. 2 is a flowchart illustrating a method for validating service information (SI) and program specific information (PSI) of a broadcast table in an electronic device.

Figure 1:
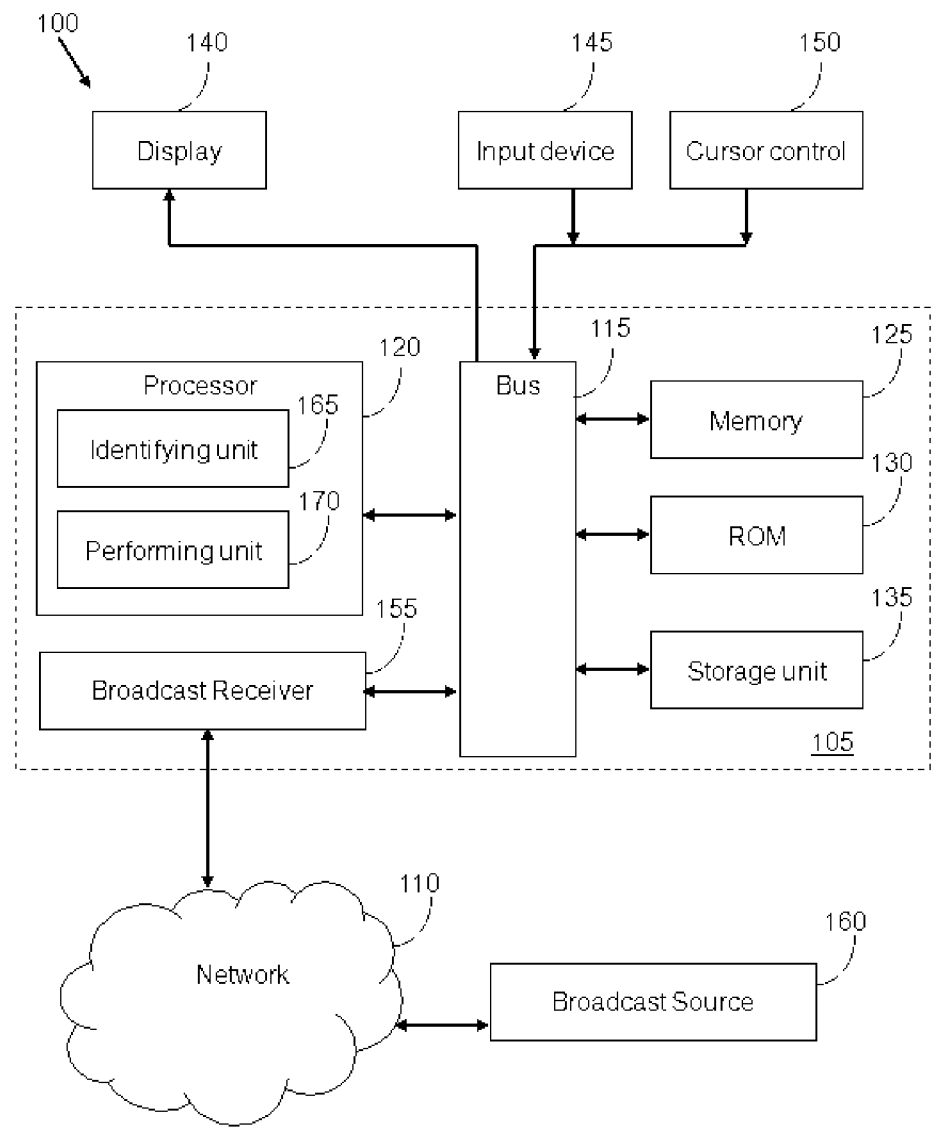
FIG. 1 is a block diagram of a system, in accordance with one embodiment.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION OF EMBODIMENTS OF THE PRESENT INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure provide a method and system for validating service information (SI) and program specific information (PSI) of a broadcast table in an electronic device.

FIG. 1 is a block diagram of a system 100, in accordance with which various embodiments can be implemented. The system 100 includes an electronic device 105 connected to a network 110. Examples of the electronic device 105 include, but are not limited to, computer, laptop, palmtop, mobile, and personal digital assistant (PDA). Examples of the network 110 include, but are not limited to, local area network, wide area network, wired network, metropolitan area network, internet, cellular network, digital video broadcasting-handheld (DVB-H) network, digital video broadcasting-terrestrial (DVB-T) network, and wireless networks.

The electronic device 105 includes one or more elements for validating service information (SI) and program specific information (PSI) of a broadcast table.

The electronic device 105 includes a bus 115 or other communication mechanism for communicating information. The electronic device 105 includes a processor 120 coupled with the bus 115. The electronic device 105 also includes a memory 125, such as a random access memory (RAM) or other dynamic storage device, coupled to the bus 115 for storing information which can be used by the processor 120. The memory 125 can be used for storing a second cache signature. The electronic device 105 further includes a read only memory (ROM) 130 or other static storage device coupled to the bus 115 for storing static information for the processor 120. A storage unit 135, such as a magnetic disk or optical disk, is provided and coupled to the bus 115 for storing information.

The electronic device 105 can be coupled via the bus 115 to a display 140, such as a cathode ray tube (CRT), a liquid crystal display (LCD) or a light emitting diode (LED) display, for displaying information to a user. An input device 145, including alphanumeric and other keys, is coupled to the bus 115 for communicating an input to the processor 120. Another type of user input device is a cursor control 150, such as a mouse, a trackball, or cursor direction keys for communicating the input to the processor 120 and for controlling cursor movement on the display 140. The input device 145 can be included in the display 140, for example a touch screen.

Various embodiments are related to the use of the electronic device 105 for implementing the techniques described herein. In one embodiment, the techniques are performed by the processor 120 using information included in the memory 125. The information can be read into the memory 125 from another machine-readable medium, such as the storage unit 135.

The term "machine-readable medium" as used herein refers to any medium that participates in providing data that causes a machine to operate in a specific fashion. In an embodiment implemented using the electronic device 105, various machine-readable medium are involved, for example, in providing information to the processor 120. The machine-readable medium can be a storage media. Storage media includes both non-volatile media and volatile media. Non-volatile media includes, for example, optical or magnetic disks, such as the storage unit 135. Volatile media includes dynamic memory, such as the memory 125. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fiber optics, including the wires that include the bus 115. Transmission media can also take the form of acoustic or light waves, such as those generated during radio-wave and infrared data communications.

The electronic device 105 also includes a broadcast receiver 155 coupled to the bus 115. The system 100 further includes a broadcast source 160 connected to the electronic device 105 via the network 110. Examples of the broadcast source 160 include, but are not limited to, a television station and a mobile service provider. The broadcast receiver 155 can receive a first cache signature from the broadcast source 160 via the network 110. A cache signature includes and is a concatenation of following attributes:

| | |
|---|---|
| a. TransportStreamID | // 2 byte field |
| b. NetworkID | // 2 byte field |
| c. Count | // 1 byte field |
| d. SIPSI Section flags | // 1+ byte field |
| CACHE SIGNATURE = TransportStreamID ‖ NetworkID ‖ Count ‖ SIPSI Section flags | |

The processor 120 identifies differences between the first cache signature and the second cache signature. The processor 120 can also perform updating the broadcast table or updating a portion of the broadcast table, based on the identifying. The processor 120 can include or can be connected to one or more processing units, for example an identifying unit 165 and a performing unit 170. The identifying unit 165 is used for identifying differences between the first cache signature and the second cache signature. The performing unit 170 can update the broadcast table based on the identifying. The performing unit 170 can also update a portion of the broadcast table based on the identifying. The processing units are hardware circuitry performing specific functions.

In some embodiments, the electronic device 105 may not include the processing units and functions of the processing units can be performed by the processor 120.

FIG. 2 is a flowchart illustrating a method for validating service information (SI) and program specific information (PSI) of a broadcast table in an electronic device, in accordance with one embodiment.

The electronic device latches on to a transport stream of a broadcast signal and receives SI and PSI (SIPSI) data from a broadcast source. The electronic device can be based on motion picture expert group (MPEG) standards, such as MPEG-2 standard or any other MPEG-2 derived standard. The SIPSI data is the MPEG-2 system information received by the electronic device on launching of a visual application in digital broadcast technologies. Examples of the digital broadcast technologies include, but are not limited to, digital video broadcasting-handheld (DVB-H), digital video broadcasting-terrestrial (DVB-T), integrated services digital broadcasting-terrestrial (ISDB-T), digital multimedia broadcasting (DMB), advanced television systems committee (ATSC), and china multimedia mobile broadcasting (CMMB).

The method starts at step 205.

At step 210, a first cache signature is received from the broadcast source, for example a service provider. A cache signature received from the broadcast source is referred to as the first cache signature. A cache signature includes and is a concatenation of following attributes:

| | |
|---|---|
| a. TransportStreamID | // 2 byte field |
| b. NetworkID | // 2 byte field |
| c. Count | // 1 byte field |
| d. SIPSI Section flags | // 1+ byte field |
| CACHE SIGNATURE = TransportStreamID ‖ NetworkID ‖ Count ‖SIPSI Section flags | |

The cache signature is a 48 bit field. The 48 bits include 2 bytes for the transport stream identification, 2 bytes for the network identification, 1 byte for the count, and one or more bytes for the SIPSI section flags.

The first cache signature is received from the broadcast source on launching of the visual application in the electronic device or on switching on the electronic device. The broadcast table includes multiple tables. Examples of the tables include, but are not limited to, network information table (NIT), program association table (PAT), program map table (PMT), service description table (SDT), event information table (EIT), and bouquet association table (BAT). The broadcast source transmits the attributes of the first cache signature in a linkage descriptor as part of the NIT table. The linkage descriptor specifies type of linkage to information. An exemplary linkage descriptor is mentioned below:

```
Linkage_Descriptor
{
    Tag           // 1 byte: value = 0x4A
    Length        // 1 byte: indicate the remaining length of descriptor
    TransportStreamId // 2 byte: SIPSI_CACHE_SIGNATURE [0-1]
    NetworkId     // 2 byte: SIPSI_CACHE_SINATURE [2-3]
    ServiceId     // 2 byte: Ignore Service id field
    Linkage_Type // 0x85 or any user defined linkage type can be used
    If (Linkage_Type == 0x85)
    {
        for (I = 0; i< N; i++)
        {
            PlatformID    // 3 byte
            Count         // 1 byte:
                          SIPSI_CACHE_SIGNATURE [4]
            SIPSI_Section_flags // 1+ byte:
                          SIPSI_CACHE_SIGNATURE [5-N]
        }
    }
}
```

The syntax of the Linkage descriptor is mentioned in Table 51 in DVB specification ETSI EN 300 468 V1.6.1.

The count increases by one whenever there is a change in the broadcast table. The count restarts from 0 after reaching a value 255. The broadcast source notifies any change in SIPSI section using one loop for every platform present in the network.

In some embodiments, the NIT section is received from the broadcast source and the linkage descriptor of type 0x85 is parsed, and the first cache signature is determined.

In some embodiments, the first cache signature is received from the broadcast source when the visual application in the electronic device is already launched. In such cases, the electronic device may be performing a periodic update of the SIPSI data in the broadcast table.

At step 215, a second cache signature is retrieved from a memory. The memory of the electronic device is a persistent memory, for example a file system. The second cache signature is a previously received signature of a previous broadcast table that is stored in the memory when the visual application in the electronic device is closed. In subsequent launches, the electronic device needs to validate the SIPSI data stored in the previous broadcast table before use.

At step 220, differences between the first cache signature and the second cache signature are identified. The identification of the differences indicates a change in the SIPSI tables. The differences are identified by comparing the attributes of the first cache signature with the second cache signature.

In one embodiment, when the electronic device is switched on, the visual application is launched on the electronic device or on periodic refreshing of SIPSI data then the identifying includes determining if the transport stream identification of the first cache signature is similar to the second cache signature. If there is no difference between the transport stream identification of the first cache signature and the second cache signature then the second cache signature is used and the new SIPSI table is not received. The identifying further includes determining count difference between the first cache signature and the second cache signature, if it is determined that the transport stream identification of the first cache signature and of the second cache signature are similar. If it is determined that the transport stream identification of the first cache signature and of the second cache signature are not similar, the broadcast table is fully updated. The identifying further includes determining an updated portion of the broadcast table. The updated portion of the broadcast table is determined using the SIPSI section flags attribute.

In some embodiments, when the electronic device moves to an out of coverage area when the visual application is already launched and subsequently returns, the SIPSI data in the broadcast table is again validated. The second cache signature is retrieved from the memory. The electronic device scans all valid frequencies and checks signal quality associated with the frequencies. If the signal quality is greater than a threshold value, the differences between the first cache signature and the second cache signature are identified. If the signal quality is not greater than a threshold value, the frequencies are again scanned. The identifying includes determining if the transport stream identification and network identification of the first cache signature is similar to the second cache signature. If there is no difference between the transport stream identification and the network identification of the first cache signature and the second cache signature then it is concluded that the electronic device has latched on correct transport stream and the electronic device can play the media on this transport stream. The new SIPSI table is not received. The identifying further includes determining count difference between the first cache signature and the second cache signature, if it is determined that the transport stream identification and the network identification of the first cache signature and of the second cache signature are similar. If it is determined that the transport stream identification and the network identification of the first cache signature and of the second cache signature are not similar, the broadcast table is fully updated.

If the count difference is more than one, it is concluded that the electronic device has missed at least two SIPSI data updates. If the count difference is equal to one, the SIPSI section flags attribute indicates the portion of the broadcast table that has been updated. An exemplary categorization of the SIPSI section flags is illustrated in Table 1.

TABLE 1

| 7 | 6 | 5 | 4 | 3 | 2 | 1 | 0 |
|---|---|---|---|---|---|---|---|
| EXT | BAT | EIT | SDT | INT | PMT | PAT | NIT |

Table 1 illustrates the SIPSI section flags attribute. Bits 0 to 7 are associated with the different SIPSI tables, such as NIT, PAT, PMT, INT, SDT, EIT, BAT, and EXT. INT refers to the platform identification. EXT bit is an extension indicator that can be used to include more SIPSI tables. All the bits toggle between 0 and 1 to indicate a change in the respective tables.

At step 225, at least one of updating of the broadcast table based on the identifying and updating of the portion of the broadcast table based on the identifying is performed. When the count difference is more than one, the broadcast table is fully updated. If the count difference is equal to one, the portion of the broadcast table is identified and updated. The portion of the SIPSI table which needs to be updated is determined using SIPSI Section flags attribute.

In some embodiments, the electronic device ascertains availability of the second cache signature in the memory. If the second cache signature does not exist, the broadcast table is fully updated.

The method stops at step 230.

The method described above is explained in conjunction with following example:

A mobile service provider broadcasts a television channel to a mobile device user. The mobile device on launching the television channel receives a first cache signature from the mobile service provider having information of the attributes, such as T1=0x40 91 12 23 01 07. The first cache signature T1 is calculated from:
NetworkId=0x4091
TransportStreamId=0x1223
Count=0x01
PlatformId=0x167733939
SIPSI_Section_flags=0x07

The mobile device retrieves a second cache signature T2=0x40 91 12 23 00 00 from its memory. The second cache signature T2 was calculated from:
NetworkId=0x4091
TransportStreamId=0x1223
Count=0x00
PlatformId=0x167733939
SIPSI_Section_flags=0x00

The differences between the first cache signature and the second cache signature are identified as the count has increased by one. The count indicates that the mobile device has missed only one SIPSI data update of the broadcast table. The SIPSI section flags attribute has changed from 00 to 07. For example, SIPSI section flags attribute corresponding to 00 represents Table 2:

TABLE 2

| 0 | 0 | 0 | 0 | 0 | 0 | 0 | 0 |
|---|---|---|---|---|---|---|---|
| EXT | BAT | EIT | SDT | INT | PMT | PAT | NIT |

SIPSI section flags attribute corresponding to 07 represents Table 3:

TABLE 3

| 0 | 0 | 0 | 0 | 0 | 1 | 1 | 1 |
|---|---|---|---|---|---|---|---|
| EXT | BAT | EIT | SDT | INT | PMT | PAT | NIT |

On performing exclusive or (XOR) operation, the bits associated with NIT, PAT, and PMT are determined to be changed indicating update of the NIT, PAT and PMT in the broadcast table.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

The present invention is applicable to electronic devices such as computer, laptop, palmtop, mobile, and personal digital assistant (PDA).

The invention claimed is:

1. A method for validating Service Information (SI) and Program Specific Information (PSI) of a broadcast table in an electronic device, the method comprising:
receiving a first cache signature from a broadcast source;
retrieving a second cache signature from a memory;
identifying differences between the first cache signature and the second cache signature;
fully updating the broadcast table based on identifying that a first identification of the first cache signature is different from a second identification of the second cache signature; and
fully updating the broadcast table or updating a portion of the broadcast table based on identifying that the first identification of the first cache signature is identical to the second identification of the second cache signature,
wherein a first count value of the first cache signature increases whenever there is a change in the broadcast table,
wherein the identifying further comprises:
determining a count difference between the first count value of the first cache signature and a second count value of the second cache signature, based on determining that the first identification is identical to the second identification.

2. The method of claim 1, wherein the receiving comprises:
determining the first cache signature.

3. The method of claim 1, wherein the identifying comprises:
determining if a transport stream identification of the first cache signature is identical to a transport stream identification of the second cache signature.

4. The method of claim 1, wherein the identifying comprises:
determining if network identification and transport stream identification of the first cache signature are identical to network identification and transport stream identification of the second cache signature.

5. The method of claim 1, wherein the identifying further comprises:
determining an updated portion of the broadcast table.

6. The method of claim 1 further comprising:
scanning frequencies if the electronic device is out of coverage area; and
checking signal quality associated with the frequencies.

7. An electronic device for validating Service Information (SI) and Program Specific Information (PSI) of a broadcast table, the electronic device comprising:
a broadcast receiver configured to receive a first cache signature;
a memory configured to store a second cache signature; and
a processor configured to:
identify differences between the first cache signature and the second cache signature;
fully update the broadcast table based on identifying that a first identification of the first cache signature is different from a second identification of the second cache signature;
fully update the broadcast table or updating a portion of the broadcast table based on identifying that the first identification of the first cache signature is identical to the second identification of the second cache signature,
wherein a first count value of the first cache signature increases whenever there is a change in the broadcast table,
wherein the processor is configured to determine a count difference between the first count value of the first cache signature and a second count value of the second cache signature, based on determining that the first identification is identical to the second identification.

8. The method of claim 3, wherein the count difference between the first count value of the first cache signature and the second count value of the second cache signature is determined, based on determining that the transport stream identification of the first cache signature is identical to the transport stream identification of the second cache signature.

9. The method of claim 4, wherein the count difference between the first count value of the first cache signature and the second count value of the second cache signature is determined, based on determining that the network identification and the transport stream identification of the first cache signature are identical to the network identification and the transport stream identification of the second cache signature.

10. The method of claim 1, wherein the broadcast table is fully updated when the count difference is more than one, and the portion of the broadcast table is updated when the count difference is equal to one.

11. The electronic device of claim 7, wherein the processor is configured to determine if a transport stream identification of the first cache signature is identical to a transport stream identification of the second cache signature.

12. The electronic device of claim 11, wherein the processor is configured to determine the count difference between the first count value of the first cache signature and the second count value of the second cache signature, based on determining that the transport stream identification of the first cache signature is identical to the transport stream identification of the second cache signature.

13. The electronic device of claim 7, wherein the processor is configured to determine if network identification and transport stream identification of the first cache signature are identical to network identification and transport stream identification of the second cache signature.

14. The electronic device of claim 13, wherein the processor is configured to determine the count difference between the first count value of the first cache signature and the second count value of the second cache signature, based on determining that the network identification and the transport stream identification of the first cache signature are identical to the network identification and the transport stream identification of the second cache signature.

15. The electronic device of claim 7, wherein the broadcast table is fully updated when the count difference is more than one, and the portion of the broadcast table is updated when the count difference is equal to one.

* * * * *